(12) United States Patent
Blue et al.

(10) Patent No.: US 12,071,122 B2
(45) Date of Patent: Aug. 27, 2024

(54) METHODS AND SYSTEM FOR OPERATING A DRIVELINE

(71) Applicant: Ford Global Technologies, LLC, Dearborn, MI (US)

(72) Inventors: Corey Blue, Ypsilanti, MI (US); Scott James Thompson, Canton, MI (US); Stephen Michael Cicala, Dearborn Heights, MI (US); Mary Bellino, Dearborn, MI (US); Bradley D. Riedle, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 681 days.

(21) Appl. No.: 17/302,691

(22) Filed: May 10, 2021

(65) Prior Publication Data

US 2021/0261113 A1 Aug. 26, 2021

Related U.S. Application Data

(62) Division of application No. 16/243,932, filed on Jan. 9, 2019, now Pat. No. 11,097,719.

(51) Int. Cl.
*B60W 20/13* (2016.01)
*B60W 10/02* (2006.01)
(Continued)

(52) U.S. Cl.
CPC ............ *B60W 20/13* (2016.01); *B60W 10/02* (2013.01); *B60W 10/06* (2013.01); *B60W 10/10* (2013.01); *B60W 10/26* (2013.01); *B60W 10/30* (2013.01); *B60W 20/40* (2013.01); *B60W 2510/0233* (2013.01); *B60W 2510/0283* (2013.01); *B60W 2510/0657* (2013.01);
(Continued)

(58) Field of Classification Search
CPC ...... B60W 20/13; B60W 10/06; B60W 10/10; B60W 10/30; B60W 10/26; B60W 20/40; B60W 10/02; B60W 2710/30; B60W 2510/0283; B60W 2510/0233; B60W 2510/0657; B60W 2510/107; B60W 2510/244; B60W 2710/021; B60W 2710/0605; B60W 2710/0666; B60W 2710/1083; B60W 2710/244; B60W 2510/081; B60W 2510/1015; B60W 20/15; B60W 10/0235; B60W 10/115; B60W 2710/027; B60W 10/101; B60W 10/08; B60W 10/023; B60W 20/00; B60W 2510/1085; B60W 2510/0275; B60W 2510/083; B60Y 2200/92; Y02T 10/62; B60K 6/387; B60K 2006/4825
See application file for complete search history.

(56) References Cited

U.S. PATENT DOCUMENTS

8,545,367 B2   10/2013  Hartz et al.
9,435,431 B1   9/2016   Lundberg et al.
(Continued)

*Primary Examiner* — Shon G Foley
(74) *Attorney, Agent, or Firm* — David Kelley; McCoy Russell LLP (57) ABSTRACT

Systems and methods for operating a driveline of a hybrid vehicle are described. In one example, a torque that is produced by an engine is adjusted responsive to a transmission oil temperature and a speed of a torque converter impeller so that temperature of oil in a transmission lube circuit may be maintained at a desired temperature.

20 Claims, 6 Drawing Sheets

(51) Int. Cl.
*B60W 10/06* (2006.01)
*B60W 10/10* (2012.01)
*B60W 10/26* (2006.01)
*B60W 10/30* (2006.01)
*B60W 20/40* (2016.01)

(52) U.S. Cl.
CPC . *B60W 2510/107* (2013.01); *B60W 2510/244* (2013.01); *B60W 2710/021* (2013.01); *B60W 2710/0605* (2013.01); *B60W 2710/0666* (2013.01); *B60W 2710/1083* (2013.01); *B60W 2710/244* (2013.01); *B60W 2710/30* (2013.01); *B60Y 2200/92* (2013.01)

(56) References Cited

U.S. PATENT DOCUMENTS

| | | | |
|---|---|---|---|
| 10,513,251 B2 * | 12/2019 | Lee | B60W 20/20 |
| 2004/0045749 A1 | 3/2004 | Jaura et al. | |
| 2008/0200301 A1 | 8/2008 | Shimizu et al. | |
| 2009/0247355 A1 | 10/2009 | Tryon et al. | |
| 2009/0259381 A1 | 10/2009 | Wilson et al. | |
| 2012/0109478 A1 | 5/2012 | Mochiyama et al. | |
| 2013/0296124 A1 | 11/2013 | Pietron et al. | |
| 2015/0112524 A1 | 4/2015 | Wang et al. | |

* cited by examiner

METHODS AND SYSTEM FOR OPERATING A DRIVELINE

CROSS REFERENCE TO RELATED APPLICATION

The present application is a divisional of U.S. Non-Provisional patent application Ser. No. 16/243,932, entitled "METHODS AND SYSTEM FOR OPERATING A DRIVELINE," and filed on Jan. 9, 2019. The entire contents of the above-referenced application are hereby incorporated by reference for all purposes.

FIELD

The present description relates to methods and a system for operating a driveline of a hybrid vehicle.

BACKGROUND AND SUMMARY

A hybrid vehicle may include an internal combustion engine and an electric machine to provide propulsive effort. The internal combustion engine may be deactivated and stopped during low demand conditions to conserve fuel. The electric machine may provide propulsive effort at low and high demand conditions to conserve fuel and increase driveline output. The internal combustion engine and the driveline disconnect clutch may be selectively decoupled from each other via a driveline disconnect clutch. The driveline disconnect clutch may closed when the internal combustion engine is providing power to the electric machine to charge an electric energy storage device. However, charging an electric energy storage device may lead to higher transmission oil temperatures when the hybrid vehicle is not moving since a transmission oil pump's flow rate may be limited. In particular, transmission oil may be directed to the driveline disconnect clutch instead of a transmission oil cooler so that the driveline disconnect clutch does not slip and so that charging of the electric energy storage device may be maintained. The higher transmission oil temperatures may cause accelerated degradation of transmission oil and its lubricating properties.

The inventors herein have recognized the above-mentioned issues and have developed a driveline operating method, comprising: adjusting engine torque responsive to a transmission oil temperature and a speed of a torque converter impeller via a controller; and adjusting a transmission line pressure responsive to the engine torque.

By adjusting engine torque responsive to a transmission oil temperature and a speed of a torque converter impeller, it may be possible to provide the technical result of limiting transmission oil temperature during conditions when transmission oil pump flow may be constrained. Further, engine torque may be adjusted to a level that provides a significant portion of torque to provide a desired level of electric energy storage device charging while slippage of a driveline disconnect may be reduced. In one example, transmission line pressure may be adjusted so that driveline disconnect clutch torque capacity follows the reduction in engine torque so that oil flow to the transmission oil cooler may be improved, thereby limiting transmission oil temperature while delivering charge to an electric energy storage device.

The present description may provide several advantages. In particular, the approach may reduce transmission oil temperatures and degradation. Further, the approach may allow continued charging of an electric energy storage device. In addition, the approach may compensate for conditions when a torque converter clutch is open or locked so that cooling of transmission oil may be permitted.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 2:
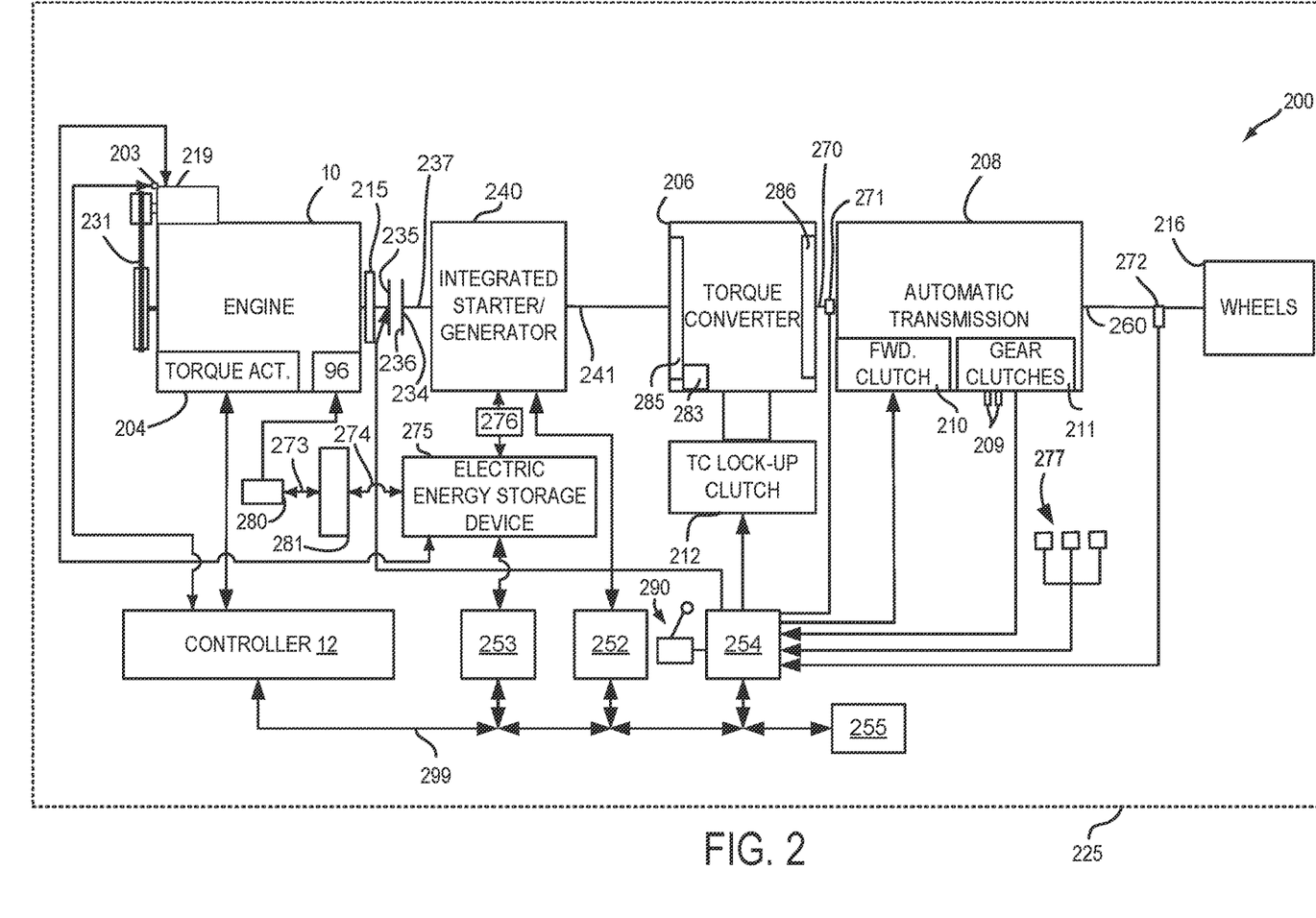
FIG. 2 is a schematic diagram of a hybrid vehicle driveline.
Figure 3:
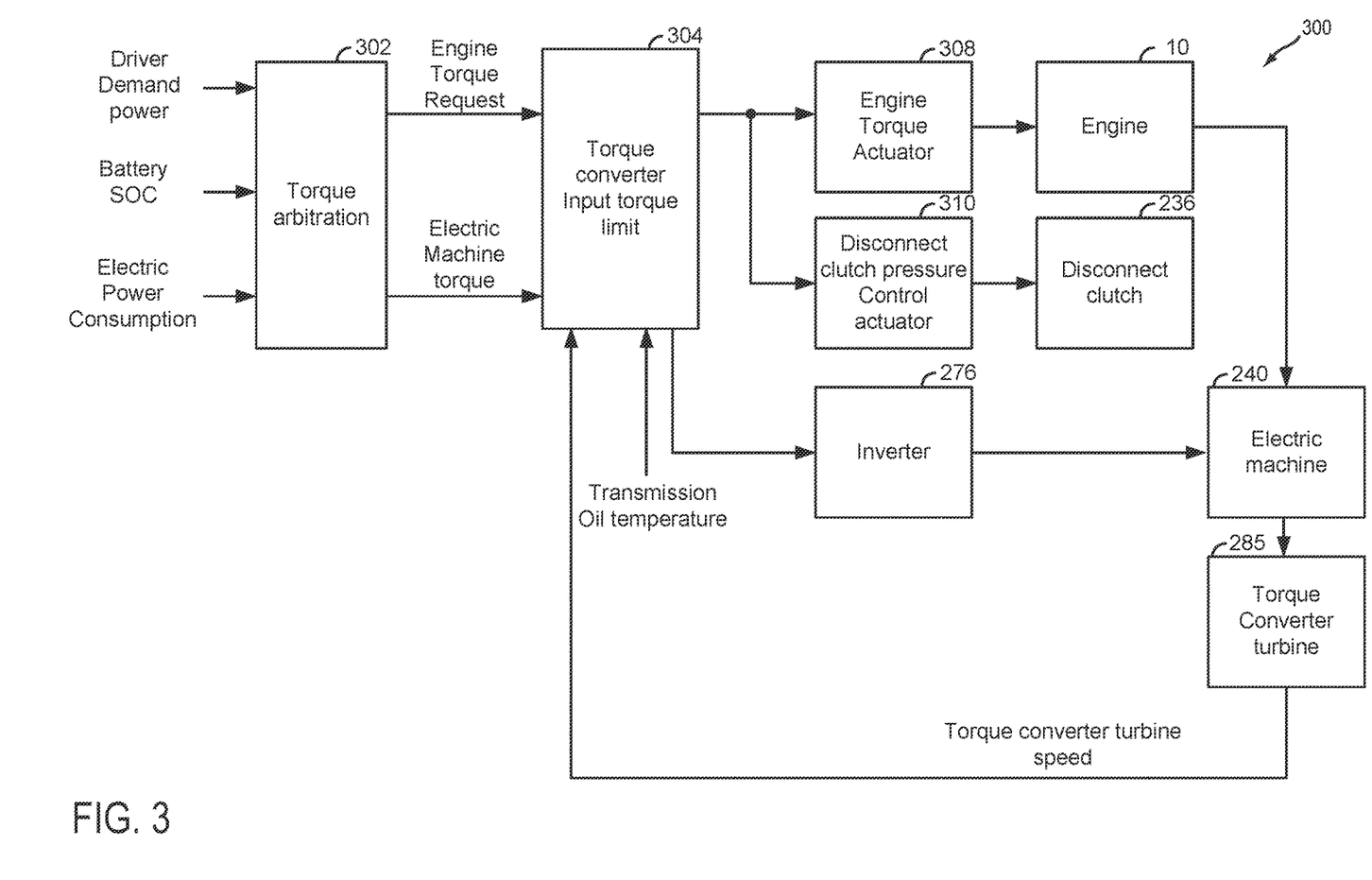
FIG. 3 shows a block diagram for controlling transmission oil temperature.
Figure 4:
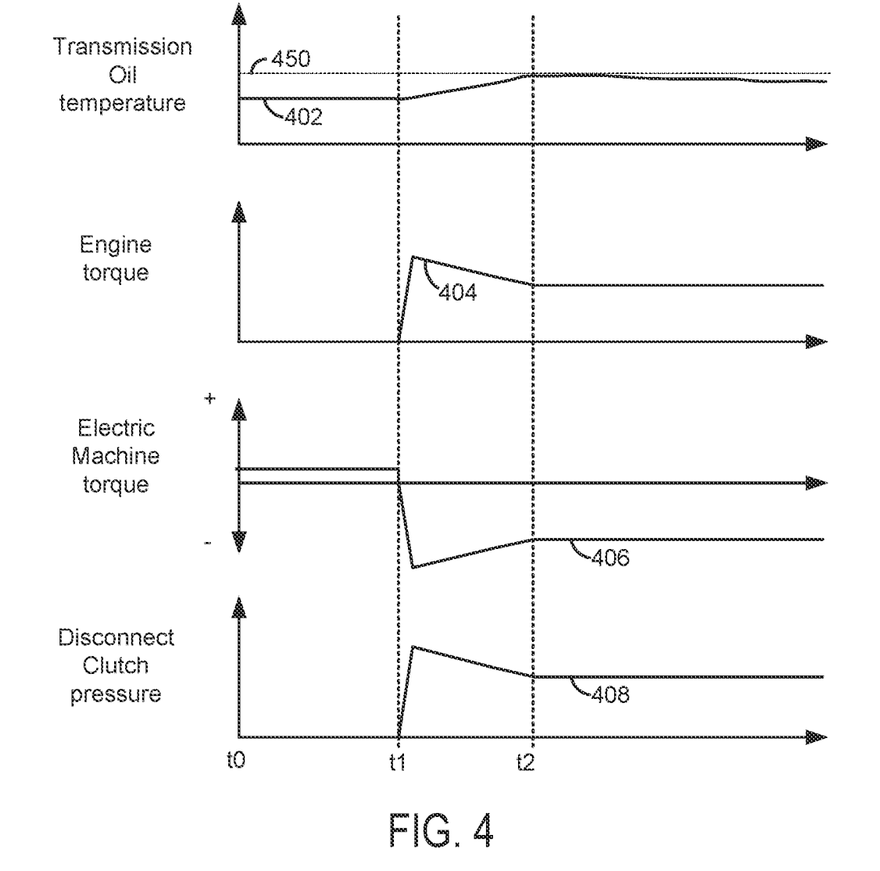
FIG. 4 shows an example driveline operating sequence.
Figure 5:
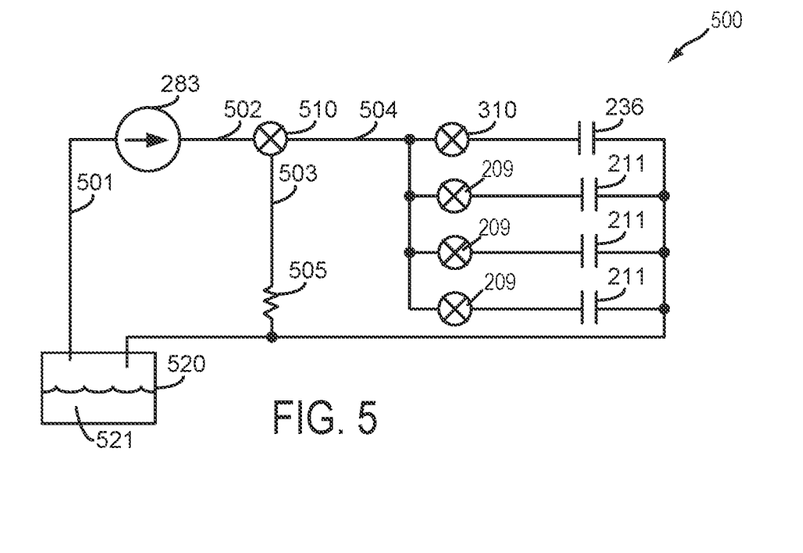
FIG. 5 shows example transmission oil line circuitry.
Figure 6A:
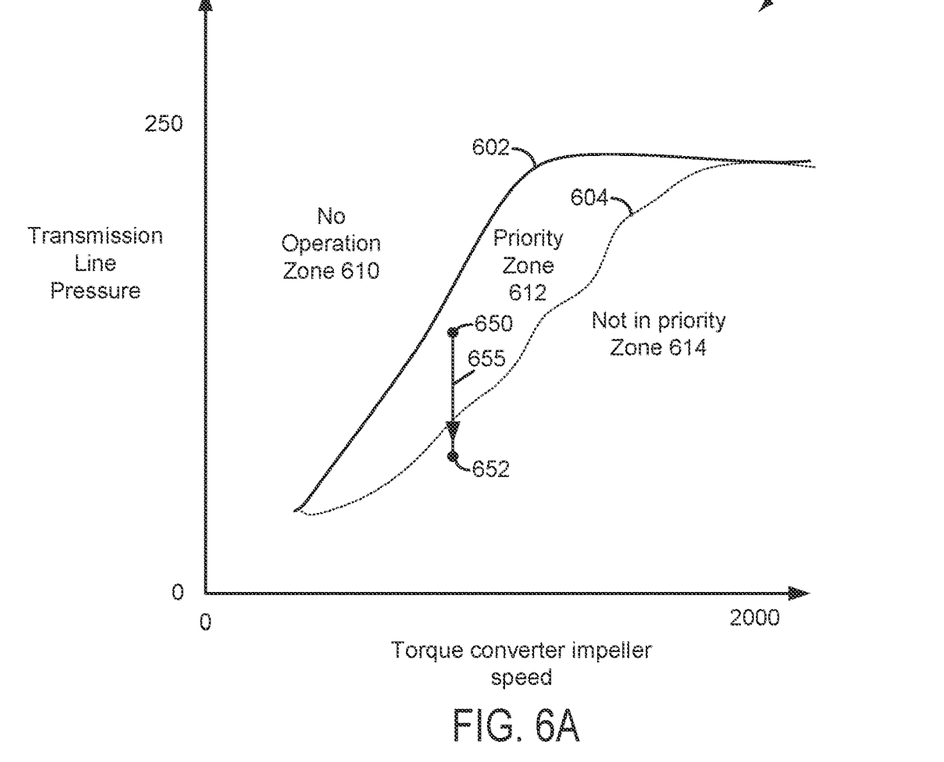
FIG. 6A shows an example plot that illustrates a priority zone for transmission oil pressure control.
Figure 6B:
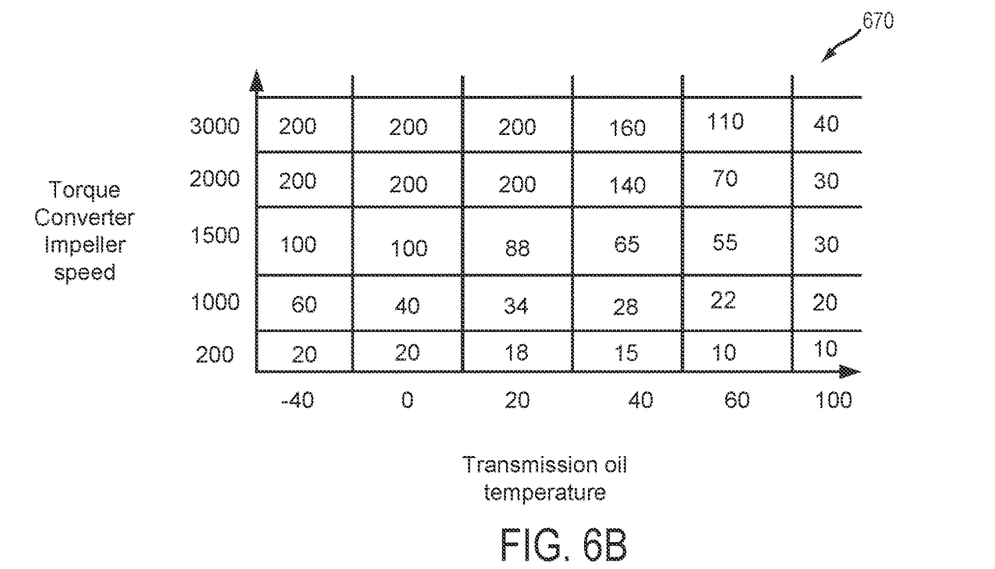
FIG. 6B shows an example table for limiting torque converter impeller torque.

The present description is related to operating a driveline of a hybrid vehicle. The driveline may include an engine of the type shown in FIG. 1. The hybrid driveline may be configures as shown in FIG. 2. The hybrid vehicle driveline may be operated via a controller as shown in FIG. 3. The hybrid driveline may be operated as shown in the sequence of FIG. 4. The hybrid driveline may include transmission hydraulic circuitry as shown in FIG. 5. Pressure with the transmission may be adjusted according to a priority zone as shown in FIG. 6A. Torque converter impeller torque may be limited via a table as shown in FIG. 6B. The driveline may be operated according to the method of FIG. 7.

Figure 1:
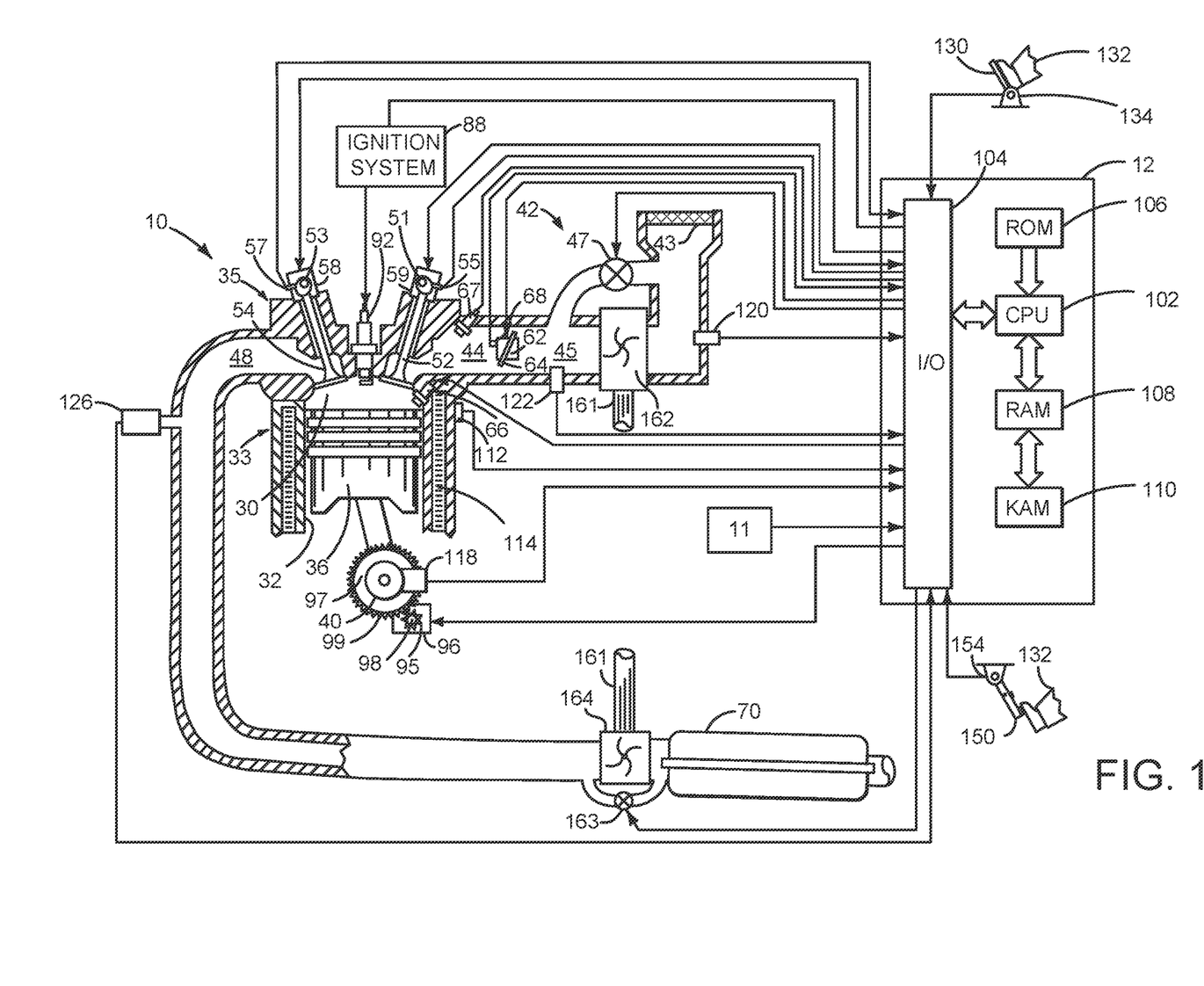
FIG. 1 is a schematic diagram of an engine.

Referring to FIG. 1, internal combustion engine 10, comprising a plurality of cylinders, one cylinder of which is shown in FIG. 1, is controlled by electronic engine controller 12. The controller 12 receives signals from the various sensors shown in FIGS. 1 and 2 and employs the actuators shown in FIGS. 1 and 2 to adjust engine and driveline operation based on the received signals and instructions stored in memory of controller 12.

Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Optional starter 96 (e.g., low voltage (operated with less than 30 volts) electric machine) includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply power to crankshaft 40 via a belt or chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58. Valve activation devices 58 and 59 may be electro-mechanical devices.

Direct fuel injector 66 is shown positioned to inject fuel directly into cylinder 30, which is known to those skilled in the art as direct injection. Port fuel injector 67 is shown positioned to inject fuel into the intake port of cylinder 30, which is known to those skilled in the art as port injection. Fuel injectors 66 and 67 deliver liquid fuel in proportion to pulse widths provided by controller 12. Fuel is delivered to fuel injectors 66 and 67 by a fuel system (not shown) including a fuel tank, fuel pump, and fuel rail (not shown).

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Waste gate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of three-way catalyst 70. Alternatively, a two-state exhaust gas oxygen sensor may be substituted for UEGO sensor 126.

Catalyst 70 can include multiple bricks. In another example, multiple emission control devices, each with multiple bricks, can be used.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 (e.g., a human/machine interface) for sensing force applied by human driver 132; a position sensor 154 coupled to brake pedal 150 (e.g., a human/machine interface) for sensing force applied by human driver 132, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

Controller 12 may also receive input from human/machine interface 11. A request to start the engine or vehicle may be generated via a human and input to the human/machine interface 11. The human/machine interface 11 may be a touch screen display, pushbutton, key switch or other known device.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational power of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle 225 including a powertrain or driveline 200. The powertrain of FIG. 2 includes engine 10 shown in FIG. 1. Powertrain 200 is shown including vehicle system controller 255, engine controller 12, electric machine controller 252, transmission controller 254, and energy storage device controller 253. The controllers may communicate over controller area network (CAN) 299. Each of the controllers may provide information to other controllers such as power output limits (e.g., power output of the device or component being controlled not to be exceeded), power input limits (e.g., power input of the device or component being controlled not to be exceeded), power output of the device being controlled, sensor and actuator data, diagnostic information (e.g., information regarding a degraded transmission, information regarding a degraded engine, information regarding a degraded electric machine, information regarding degraded brakes). Further, the vehicle system controller 255 may provide commands to engine controller 12, electric machine controller 252, and transmission controller 254 to achieve driver input requests and other requests that are based on vehicle operating conditions.

For example, in response to a driver releasing an accelerator pedal and vehicle speed, vehicle system controller 255 may request a desired wheel power or a wheel power level to provide a desired rate of vehicle deceleration. The requested desired wheel power may be provided by vehicle system controller 255 requesting a first braking power from electric machine controller 252 and a second braking power from engine controller 212, the first and second powers providing a desired driveline braking power at vehicle wheels 216.

In other examples, the partitioning of controlling powertrain devices may be partitioned differently than is shown in FIG. 2. For example, a single controller may take the place of vehicle system controller 255, engine controller 12, electric machine controller 252, and transmission controller 254. Alternatively, the vehicle system controller 255 and the engine controller 12 may be a single unit while the electric machine controller 252, and the transmission controller 254 are standalone controllers.

In this example, powertrain 200 may be powered by engine 10 and electric machine 240. In other examples, engine 10 may be omitted. Engine 10 may be started with an engine starting system shown in FIG. 1, via BISG 219, or via driveline integrated starter/generator (ISG) 240 also known as an integrated starter/generator. A speed of BISG 219 may be determined via optional BISG speed sensor 203. Driveline ISG 240 (e.g., high voltage (operated with greater than 30 volts) electrical machine) may also be referred to as an electric machine, motor, and/or generator. Further, power of engine 10 may be adjusted via power actuator 204, such as a fuel injector, throttle, etc.

BISG is mechanically coupled to engine 10 via belt 231. BISG may be coupled to crankshaft 40 or a camshaft (e.g., 51 or 53 of FIG. 1). BISG may operate as a motor when supplied with electrical power via electric energy storage device 275 or low voltage battery 280. BISG may operate as a generator supplying electrical power to electric energy storage device 275 or low voltage battery 280. Bi-directional DC/DC converter 281 may transfer electrical energy from a high voltage buss 274 to a low voltage buss 273 or vice-versa. Low voltage battery 280 is electrically coupled to low voltage buss 273. Electric energy storage device 275 is electrically coupled to high voltage buss 274. Low voltage battery 280 selectively supplies electrical energy to starter motor 96.

An engine output power may be transmitted to an input or first side of powertrain disconnect clutch 235 through dual mass flywheel 215. Disconnect clutch 236 may be electrically or hydraulically actuated. The downstream or second side 234 of disconnect clutch 236 is shown mechanically coupled to ISG input shaft 237.

ISG 240 may be operated to provide power to powertrain 200 or to convert powertrain power into electrical energy to be stored in electric energy storage device 275 in a regeneration mode. ISG 240 is in electrical communication with inverter 276, and inverter 276 is in electrical communication with energy storage device 275. Inverter 276 may convert direct current (DC) power from electric energy storage device into alternating current (AC) power to operate ISG 240 as a motor. Alternatively, inverter 276 may convert AC power from ISG 240 into DC power to store in electric energy storage device 275. ISG 240 has a higher output power capacity than starter 96 shown in FIG. 1 or BISG 219. Further, ISG 240 directly drives powertrain 200 or is directly driven by powertrain 200. There are no belts, gears, or chains to couple ISG 240 to powertrain 200. Rather, ISG 240 rotates at the same rate as powertrain 200. Electrical energy storage device 275 (e.g., high voltage battery or power source) may be a battery, capacitor, or inductor. The downstream side of ISG 240 is mechanically coupled to the impeller 285 of torque converter 206 via shaft 241. The upstream side of the ISG 240 is mechanically coupled to the disconnect clutch 236. ISG 240 may provide a positive power or a negative power to powertrain 200 via operating as a motor or generator as instructed by electric machine controller 252.

Torque converter 206 includes a turbine 286 to output power to input shaft 270. Input shaft 270 mechanically couples torque converter 206 to automatic transmission 208. Torque converter 206 also includes a torque converter bypass lock-up clutch 212 (TCC). Power is directly transferred from impeller 285 to turbine 286 when TCC is locked. TCC is electrically operated by controller 12. Alternatively, TCC may be hydraulically locked. In one example, the torque converter may be referred to as a component of the transmission.

When torque converter lock-up clutch 212 is fully disengaged, torque converter 206 transmits engine power to automatic transmission 208 via fluid transfer between the torque converter turbine 286 and torque converter impeller 285, thereby enabling power multiplication. In contrast, when torque converter lock-up clutch 212 is fully engaged, the engine output power is directly transferred via the torque converter clutch to an input shaft 270 of transmission 208. Alternatively, the torque converter lock-up clutch 212 may be partially engaged, thereby enabling the amount of power directly relayed to the transmission to be adjusted. The transmission controller 254 may be configured to adjust the amount of power transmitted by torque converter 212 by adjusting the torque converter lock-up clutch in response to various engine operating conditions, or based on a driver-based engine operation request.

Torque converter 206 also includes pump 283 that pressurizes fluid to operate disconnect clutch 236, forward clutch 210, and gear clutches 211. Pump 283 is driven via impeller 285, which rotates at a same speed as ISG 240.

Automatic transmission 208 includes gear clutches (e.g., gears 1-10) 211 and forward clutch 210. Automatic transmission 208 is a fixed ratio transmission. Alternatively, transmission 208 may be a continuously variable transmission that has a capability of simulating a fixed gear ratio transmission and fixed gear ratios. The gear clutches 211 and the forward clutch 210 may be selectively engaged to change a ratio of an actual total number of turns of input shaft 270 to an actual total number of turns of wheels 216. Gear clutches 211 may be engaged or disengaged via adjusting fluid supplied to the clutches via shift control solenoid valves 209. Power output from the automatic transmission 208 may also be relayed to wheels 216 to propel the vehicle via output shaft 260. Specifically, automatic transmission 208 may transfer an input driving power at the input shaft 270 responsive to a vehicle traveling condition before transmitting an output driving power to the wheels 216. Transmission controller 254 selectively activates or engages TCC 212, gear clutches 211, and forward clutch 210. Transmission controller also selectively deactivates or disengages TCC 212, gear clutches 211, and forward clutch 210. Output of transmission 208 is supplied to wheels 216.

In response to a request to accelerate vehicle 225, vehicle system controller may obtain a driver demand power or power request from an accelerator pedal or other device. Vehicle system controller 255 then allocates a fraction of the requested driver demand power to the engine and the remaining fraction to the ISG or BISG. Vehicle system controller 255 requests the engine power from engine controller 12 and the ISG power from electric machine controller 252. If the ISG power plus the engine power is less than a transmission input power limit (e.g., a threshold value not to be exceeded), the power is delivered to torque converter 206 which then relays at least a fraction of the requested power to transmission input shaft 270. Transmission controller 254 selectively locks torque converter clutch 212 and engages gears via gear clutches 211 in response to shift schedules and TCC lockup schedules that may be based on input shaft power and vehicle speed. In some conditions when it may be desired to charge electric energy storage device 275, a charging power (e.g., a negative ISG power) may be requested while a non-zero driver demand power is present. Vehicle system controller 255 may request increased engine power to overcome the charging power to meet the driver demand power.

In response to a request to decelerate vehicle 225 and provide regenerative braking, vehicle system controller may provide a negative desired wheel power (e.g., desired or requested powertrain wheel power) based on vehicle speed and brake pedal position. Vehicle system controller 255 then allocates a fraction of the negative desired wheel power to the ISG 240 and the engine 10. Vehicle system controller may also allocate a portion of the requested braking power to friction brakes (not shown). Further, vehicle system controller may notify transmission controller 254 that the vehicle is in regenerative braking mode so that transmission controller 254 shifts gears 211 based on a unique shifting schedule to increase regeneration efficiency. Engine 10 and ISG 240 may supply a negative power to transmission input shaft 270, but negative power provided by ISG 240 and engine 10 may be limited by transmission controller 254 which outputs a transmission input shaft negative power limit (e.g., not to be exceeded threshold value). Further, negative power of ISG 240 may be limited (e.g., constrained to less than a threshold negative threshold power) based on operating conditions of electric energy storage device 275, by vehicle system controller 255, or electric machine controller 252. Any portion of desired negative wheel power that may not be provided by ISG 240 because of transmission or ISG limits may be allocated to engine 10 and/or friction brakes (not shown) so that the desired wheel power is provided by a combination of negative power (e.g., power absorbed) via friction brakes (not shown), engine 10, and ISG 240.

Accordingly, power control of the various powertrain components may be supervised by vehicle system controller 255 with local power control for the engine 10, transmission 208, and electric machine 240 provided via engine controller 12, electric machine controller 252, and transmission controller 254.

As one example, an engine power output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine power output by controlling a combination of fuel pulse width, fuel pulse timing, and air charge. Engine braking power or negative engine power may be provided by rotating the engine with the engine generating power that is insufficient to rotate the engine. Thus, the engine may generate a braking power via operating at a low power while combusting fuel, with one or more cylinders deactivated (e.g., not combusting fuel), or with all cylinders deactivated and while rotating the engine. The amount of engine braking power may be adjusted via adjusting engine valve timing. Engine valve timing may be adjusted to increase or decrease engine compression work. Further, engine valve timing may be adjusted to increase or decrease engine expansion work. In all cases, engine control may be performed on a cylinder-by-cylinder basis to control the engine power output.

Electric machine controller 252 may control power output and electrical energy production from ISG 240 by adjusting current flowing to and from field and/or armature windings of ISG as is known in the art.

Transmission controller 254 receives transmission input shaft position via position sensor 271. Transmission controller 254 may convert transmission input shaft position into input shaft speed via differentiating a signal from position sensor 271 or counting a number of known angular distance pulses over a predetermined time interval. Transmission controller 254 may receive transmission output shaft torque from torque sensor 272. Alternatively, sensor 272 may be a position sensor or torque and position sensors. If sensor 272 is a position sensor, controller 254 may count shaft position pulses over a predetermined time interval to determine transmission output shaft velocity. Transmission controller 254 may also differentiate transmission output shaft velocity to determine transmission output shaft acceleration. Transmission controller 254, engine controller 12, and vehicle system controller 255, may also receive addition transmission information from sensors 277, which may include but are not limited to pump output line pressure sensors, transmission hydraulic pressure sensors (e.g., gear clutch fluid pressure sensors), ISG temperature sensors, and BISG temperatures, gear shift lever sensors, and ambient temperature sensors. Transmission controller 254 may also receive requested gear input from gear shift selector 290 (e.g., a human/machine interface device). Gear shift lever may include positions for gears 1-N (where N is the an upper gear number), D (drive), and P (park)

Referring now to FIG. 3, a block diagram of an example driveline controller is shown. The controller described in block diagram 300 may be included in the method of FIG. 7 and the system of FIGS. 1 and 2 as executable instructions stored in non-transitory memory.

Driver demand power, battery state of charge (SOC), and vehicle electric power consumption are input to torque arbitration block 302. The driver demand power may be determined via a function that includes empirically determined driver demand power levels is referenced or indexed via accelerator pedal position and vehicle speed. Torque arbitration block 302 requests engine torque and electric machine torque to meet the driver demand power, vehicle electric power consumption, and electric energy storage device charging. Torque arbitration block 302 may request positive torque, no torque, or negative torque from the electric machine (e.g., 240 of FIG. 2). Torque arbitration block 302 may request positive torque (e.g., torque to rotate the driveline) via the electric machine when the electric machine is propelling the vehicle. Torque arbitration block 302 may request negative torque via the electric machine to provide charge to the electric energy storage device (e.g.,

245 of FIG. 2). Torque arbitration block may also request positive torque or negative torque (e.g. torque extracted from the driveline) from the engine (e.g., 10 of FIG. 1). Negative torque may be provided by ceasing to supply fuel and spark to the engine while the engine is rotated via the driveline. The engine torque request may be a function of driver demand power and an amount of power to charge the electric energy storage device. The engine torque request is output from block 302 to torque converter impeller limiting torque block 304. The electric machine torque request is also output from block 302 to torque converter impeller limiting torque block 304.

The combined engine torque request and electric machine request are limited at block 304, thereby limiting the torque converter impeller input torque. In particular, the sum of the engine torque request and the electric machine torque request is prevented from exceeding a threshold torque at block 304. The threshold torque may be determined via referencing a table or function of empirically determined threshold torque values via torque converter impeller speed (e.g., as shown in FIG. 6B), which is equal to ISG speed, which is equal to engine speed when the driveline disconnect clutch is fully closed. The table or function included in block 304 is also shown being referenced via transmission oil temperature. Block 304 outputs the limited engine torque request to blocks 308 and 310. Block 304 may also output a limited electric machine torque request to block 276.

At block 308, an engine torque actuator (e.g., throttle, ignition system, camshaft, valve actuator, etc.) is adjusted to adjust torque of engine 10. The engine torque is adjusted to provide the limited engine torque that is output from block 304.

At block 310, a driveline disconnect pressure control valve 310 is adjusted to provide a driveline disconnect clutch torque capacity (e.g., an amount of torque the driveline disconnect clutch may transfer without slipping) that is equal to the limited engine torque plus an offset torque to ensure that the driveline disconnect clutch 236 remains closed if it is commanded closed. For example, if the requested limited engine torque is 200 Newton-meters (Nm) and the offset torque is 10 Nm, then the torque capacity of the driveline disconnect clutch is adjusted to 210 Nm via adjusting a pressure of oil that is supplied to close the driveline disconnect clutch 236.

The requested electric machine torque is converted into adjustments to inverter 276 so that electric machine 240 provides the requested positive or negative torque. For example, switching transistors of inverter 276 are adjusted to supply AC power to electric machine 240, or the switching transistors of inverter 276 are adjusted to convert AC power from electric machine to DC power for storage in electric energy storage device 275 shown in FIG. 2.

The limited engine torque is added to the electric machine torque at electric machine 285. The combined engine torque and electric machine torque are input to the torque converter impeller 285. The speed of the torque converter impeller is returned to limit the torque converter impeller limiting block 304.

Referring now to FIG. 4, example plots of an engine operating sequence are shown. The operating sequence may be performed via the system of FIGS. 1 and 2 in cooperation with the method of FIG. 7. Vertical lines at times t0-t2 represent times of interest during the sequence. The plots in FIG. 4 are time aligned and occur at the same time.

The first plot from the top of FIG. 4 is a plot of transmission oil temperature versus time. The vertical axis represents transmission oil temperature and transmission oil temperature increases in the direction of the vertical axis arrow. The horizontal axis represents time and time increases from the left side of the figure to the right side of the figure. Solid line 402 represents transmission oil temperature. Line 450 represents a threshold transmission oil temperature (e.g., a temperature that transmission oil temperature is not desired to exceed).

The second plot from the top of FIG. 4 is a plot of engine torque versus time. The vertical axis represents an amount of engine torque that is generated and delivered to the driveline. The engine torque increases in the direction of the vertical axis arrow. The horizontal axis represents time and time increases from the left side of the figure to the right side of the figure. Solid line 404 represents an amount of engine torque.

The third plot from the top of FIG. 4 is a plot of electric machine torque versus time. The vertical axis represents an amount of electric machine torque that is generated and delivered to the driveline. The horizontal axis represents time and time increases from the left side of the figure to the right side of the figure. Solid line 406 represents an amount of electric machine torque. The electric machine torque is positive (e.g., rotating the driveline) when trace 406 is above the horizontal axis. The positive torque increases in the direction of the up pointing axis arrow. The electric machine torque is negative (e.g., generating electrical charge) when trace 406 is below the horizontal axis. The magnitude of the negative torque increases in the direction of the down pointing axis arrow.

The fourth plot from the top of FIG. 4 is a plot of hydraulic pressure that is applied to the driveline disconnect clutch versus time. The hydraulic pressure may be roughly indicative of driveline disconnect clutch torque capacity. The hydraulic pressure that is applied to the driveline disconnect clutch increases in the direction of the vertical axis arrow. The horizontal axis represents time and time increases from the left side of the figure to the right side of the figure. Trace 408 represents the hydraulic pressure that is applied to close the driveline disconnect clutch (e.g., the driveline disconnect clutch pressure).

At time t0, transmission oil temperature is low and the engine is not running (e.g., rotating and combusting fuel). The electric machine is generating a small amount of electric torque and the driveline disconnect clutch pressure is zero so the driveline disconnect clutch is fully open. Such conditions may be present when a vehicle is stopped and the electric machine is rotating the torque converter to maintain transmission pump output.

At time t1, the engine is started and it begins to generate torque. The electric machine is switched to generator mode and it begins supplying charge to the electric energy storage device. In one example, the vehicle system controller initiates these actions responsive to electric energy storage device SOC being less than a threshold. The driveline disconnect clutch pressure is increased so that engine torque may be transferred to the electric machine. The transmission oil temperature begins to rise since the transmission oil pressure is in a priority zone where at least some transmission oil pump flow is directed away from the transmission lube circuit and transmission oil cooler so that the oil pressure delivered to the driveline disconnect clutch may reach a desired pressure so that the engine torque may be delivered to the electric machine.

Between time t1 and time t2, the transmission oil temperature rises and the engine torque is reduced in response to the torque converter impeller speed and the transmission oil temperature. The pressure that is applied to the driveline disconnect clutch is reduced as the engine torque is reduced. The magnitude of the negative torque provided by the electric machine is reduced as the engine torque is reduced so that the engine speed may be maintained.

At time t2, engine torque is reduced to a level where the transmission oil pressure stops increasing and levels off at a temperature that is below threshold temperature 450. The magnitude of the negative torque produced via the electric machine levels off and the hydraulic pressure that is applied to the driveline disconnect clutch is reduced to a level that allows engine torque to be transmitted to the electric machine without the driveline disconnect clutch slipping.

In this way, the oil temperature of a transmission may be controlled even when a transmission pump lacks capacity to supply a high oil flow rate to all transmission fluid circuits. Further, engine torque is controlled and driveline disconnect clutch capacity is controlled so that engine torque may rotate an electric machine and charge an electric energy storage device without slipping the driveline disconnect clutch.

Referring now to FIG. 5, a non-limiting example transmission oil circuit diagram is shown. Circuit 500 or other transmission oil circuit configurations may be included in the system of FIGS. 1 and 2. Further, actuators shown in circuit 500 may be adjusted according to the method of FIG. 7.

Pump 283 is included in the torque converter 206 shown in FIG. 2 and it may be rotated via engine 10 or electric machine 240. Pump 283 draws oil 521 from sump 520. The oil may be pressurized by pump 283 and delivered to driveline disconnect clutch 236 or gear clutches 211. Pump 283 draws oil from sump via line or conduit 501. Pump supplies pressurized oil via passage 502 to driveline disconnect pressure control valve 310. Speed of pump 283 and a duty cycle of valve 510 may control pressure of oil in passage 504, which may be referred to as transmission line pressure. Further, adjusting the duty cycle of valve 510 may adjust flow to lube passage 503, which flows to transmission oil cooler 505. Oil that is not directed from pump 283 to line 504 may be directed to line 503. Thus, line pressure in passage 504 may be controlled via adjusting a duty cycle of an electric signal that is supplied to valve 510. Valves 510, 512, and 209 may be operated via transmission controller 254 shown in FIG. 2. It should be appreciated that the configuration of circuit 500 is non-limiting and that it may be arranged differently for different transmissions.

Referring now to FIG. 6A, a plot 600 of transmission line pressure versus torque converter impeller speed to illustrate priority zones is shown. The vertical axis represents transmission line pressure and transmission line pressure increases in the direction of the vertical axis arrow. The horizontal axis represents torque converter impeller speed and torque converter impeller speed increases in the direction of the horizontal axis arrow.

Curve 602 represents transmission line pressures when the full capacity of the transmission oil pump is supplied to the driveline disconnect clutch and/or other transmission clutches while substantially no transmission oil flow is directed to a lube circuit of the transmission and the transmission oil cooler. Curve 604 represents transmission line pressures where transmission oil pump output capacity begins to be directed away from the lube circuit and the transmission oil cooler meet requested clutch capacities for the driveline disconnect clutch and/or gear clutches. The amount of oil that is directed away from the transmission lube circuit and the transmission cooler to the driveline disconnect clutch increases in the direction from curve 604 to curve 602.

The transmission line pressure is not operated in no operation zone 610 (e.g., to the left of curve 602) and the line pressure is not in a priority zone at zone 614 (e.g., to the right of curve 604). In priority zone 612 (e.g., to the left of curve 604 and to the right of curve 602), at least a portion of output from the transmission oil pump is directed away from the transmission oil cooler and lube circuit to the driveline disconnect clutch and the gear clutches. This plot shows transmission line pressures for conditions when the torque converter lockup clutch is unlocked. The line pressure curves for conditions when the torque converter lockup clutch is fully locked are similar to those shown in plot 600, but the line pressures at each torque converter impeller speeds are reduced.

A trajectory 655 (e.g., in the direction of the arrow) shows that for a given torque converter impeller speed, line pressure may be moved from a priority pressure where at least some pump output flow is directed from the transmission lube circuit and transmission oil cooler to the driveline disconnect clutch so that a desired or requested driveline disconnect clutch torque capacity may be met. In particular, if transmission line pressure is adjusted to point 650 at a particular torque converter impeller speed to meet a desired or requested driveline disconnect clutch torque capacity, then the transmission line pressure may be reduced to point 650 to reduce transmission oil temperature while the torque converter impeller speed is maintained. Reducing the transmission line pressure to point 650 allows transmission oil to flow to the transmission oil cooler and lube circuit to keep transmission oil temperature within a desired temperature range.

Referring now to FIG. 6B, an example table for limiting torque converter impeller torque is shown. Table 670 includes a plurality of cells that may be referenced via torque converter impeller speed and transmission oil temperature. The values in table 670 represent empirically determined torque converter impeller maximum torque threshold levels (e.g., torque levels that are not to be exceeded). The values shown in table 670 are non-limiting and are for illustration purposes. Interpolation may be used to determine values between values that are included in the individual cells. In this example, vertical cells are referenced by torque converter impeller speed and horizontal cells are referenced by transmission oil temperature. The table indicates that at higher transmission oil temperatures, the torque converter impeller torque is limited or reduced to lower levels than for lower transmission oil temperatures. This allows the transmission to exit the priority line pressure control region at higher transmission oil temperatures to reduce the possibility of transmission oil degradation and component degradation.

Figure 7:
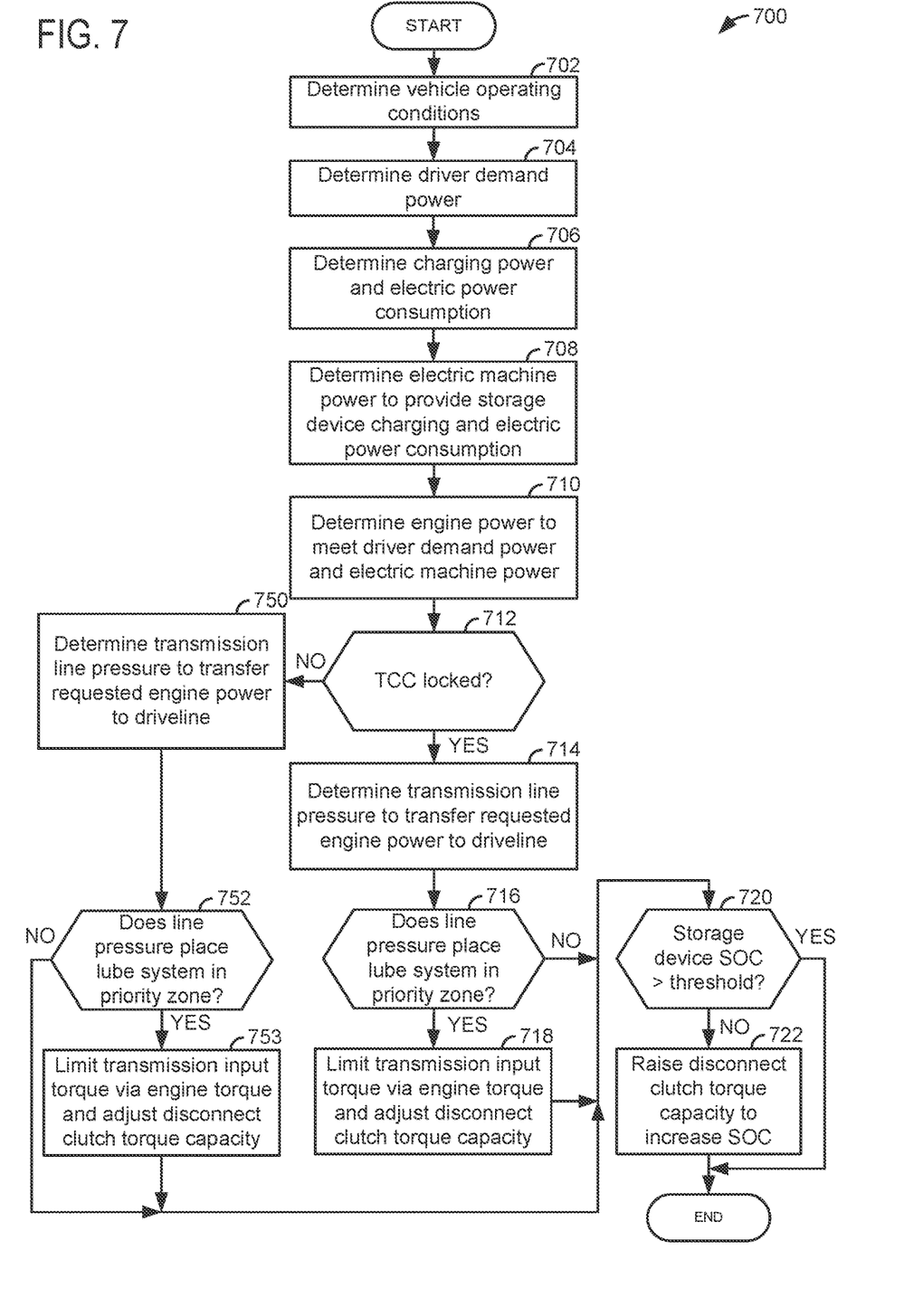
FIG. 7 shows a method for operating a driveline that includes an engine and an ISG.

Referring now to FIG. 7, a flow chart of a method for operating a driveline and maintaining transmission oil temperature below a threshold temperature while charging a battery while a vehicle is stopped or moving at less than a threshold speed is shown. The method of FIG. 7 may be incorporated into and may cooperate with the system of FIGS. 1 and 2. Further, at least portions of the method of FIG. 7 may be incorporated as executable instructions stored in non-transitory memory while other portions of the method may be performed via a controller transforming operating states of devices and actuators in the physical world. Method 700 may be executed when a vehicle in which includes the engine and electric machine described herein is stopped and not moving. Alternatively, method 700 may be performed when the vehicle is moving, at less than a threshold speed for example.

At 702, method 700 determines vehicle operating conditions. Vehicle operating conditions may include but are not limited to vehicle speed, engine speed, engine temperature, electric energy storage device state of charge (SOC), the amount of electric power being consumed by electric power consumers of the vehicle and that are external to the vehicle, engine load, and driver demand torque or power. Method 700 proceeds to 704.

At 704, method 700 estimates a driver demand power. In one example, the driver demand power may be determined via indexing or referencing a table or function that includes a plurality of empirically determined driver demand power levels. The table or function may be referenced via accelerator pedal position and vehicle speed. The table outputs the driver demand power. Method 700 proceeds to 706.

At 706, method 700 determines requested electric energy storage device charging power and the amount of electric power that is being consumed by electric power consumers in the vehicle and electric power consumers that are external to the vehicle. In one example, the requested electric energy storage device charging power may be determined via referencing a table or function of empirically determined electric energy storage device charging power values via electric energy storage device SOC and electric energy storage device temperature. The amount of electric power that is being consumed may be determined via the current and voltage that is supplied to the electric power consumers. Method 700 proceeds to 710.

At 708, method 700 determines and amount of electric machine power to generate the electric power to charge the electric energy storage device and to supply the electric power consumers. In one example, the amount of electric machine power to generate the power to charge the electric energy storage device and to supply electric power to the electric power consumers is a sum of the amount of electric power supplied to the electric power consumers and the requested amount of electric power to charge the electric energy storage device. Method 700 proceeds to 710.

At 710, method 700 determines a requested amount of engine power. In one example, the requested engine power may be determined via indexing or referencing a table or function of empirically determined engine power values via the driver demand power determined at 704 and the electric machine power to generate the electric power to charge the electric energy storage device and to supply the electric power consumers determined at 708. The table or function outputs an engine power amount. Method 700 proceeds to 712.

At 712, method 700 judges if the torque converter clutch (TCC) is fully locked. In one example, method 700 may judge that the TCC is fully locked based on a value of a variable stored in controller memory. In another example, a sensor may indicate whether or not the TCC is locked. If method 700 judges that the TCC is fully locked, the answer is yes and method 700 proceeds to 714. Otherwise, the answer is no and method 700 proceeds to 750.

At 714, method 700 determines a transmission line pressure to transfer the requested amount of engine power to the electric machine and the driveline downstream of the driveline disconnect clutch. In one example, method 700 indexes or references a table or function of empirically determined line pressure values via the requested engine torque amount plus a predetermined offset torque amount. The engine torque amount may be determined by dividing the requested engine power amount by the present engine speed. The table or function output a requested line pressure and method 700 proceeds to 716.

At 716, method 700 judges if the requested line pressure puts the lube circuit in a priority zone where at least a portion of transmission oil pump output flow is directed to the driveline disconnect clutch to meet the requested line pressure and the TCC is locked. In one example, method 700 references a function that describes a relationship between line pressure and torque converter impeller speed to describe priority and non-priority zones for operating the transmission with a locked torque converter (e.g., similar to FIG. 6A). If method 700 references the function and determines that the requested line pressure puts the lube circuit in a priority zone, then the answer is yes and method 700 proceeds to 718. Otherwise, the answer is no and method 700 proceeds to 720.

At 718, method 700 limits torque converter impeller torque via limiting engine torque. Further, method 700 reduces the driveline disconnect clutch torque capacity via reducing transmission line pressure and directing at least a portion of the pumps flow capacity to the transmission lube circuit and the transmission cooler, thereby improving cooling of transmission oil. Since the line pressure was determined to be in a priority zone where at least a portion of flow is directed from the lube and transmission cooler to the driveline disconnect clutch, which tends to increase transmission oil temperature, the transmission line pressure is reduced as a function of transmission oil temperature and torque converter impeller speed (e.g., according to a function similar to the function illustrated in FIG. 6A). The reduction in line pressure reduces the torque capacity of the driveline disconnect clutch. Therefore, the engine torque is reduced to a torque that is less than the driveline disconnect clutch torque capacity (e.g., driveline torque capacity minus a predetermined offset torque) as a function of transmission oil temperature and torque converter impeller speed (e.g., according to a function similar to the function illustrated in FIG. 6A) and the negative torque of the electric machine is reduced to a torque that is less than engine torque so that the engine does not stall. The amount of the reduction in line pressure is also based on the condition of the torque converter clutch being locked, which necessitates a lower transmission line pressure to exit the priority zone. By reducing the negative torque of the electric machine (e.g., when the electric machine is operating in a generator mode), charging current supplied by the electric machine to the electric energy storage device is reduced, but transmission cooling is improved and while charging of the electric energy storage device may continue. Method 700 proceeds to 720.

At 750, method 700 determines a transmission line pressure to transfer the requested amount of engine power to the electric machine and the driveline downstream of the driveline disconnect clutch. In one example, method 700 indexes or references a table or function of empirically determined line pressure values via the requested engine torque amount plus a predetermined offset torque amount. The engine torque amount may be determined by dividing the requested engine power amount by the present engine speed. The table or function output a requested line pressure and method 700 proceeds to 752.

At 752, method 700 judges if the requested line pressure puts the lube circuit in a priority zone where at least a portion of transmission oil pump output flow is directed to the driveline disconnect clutch to meet the requested line pressure and the TCC is unlocked. In one example, method 700 references a function that describes a relationship between line pressure and torque converter impeller speed to describe priority and non-priority zones for operating the transmission with a locked torque converter (e.g., similar to FIG.

6A). If method 700 references the function and determines that the requested line pressure puts the lube circuit in a priority zone, then the answer is yes and method 700 proceeds to 753. Otherwise, the answer is no and method 700 proceeds to 720.

At 753, method 700 limits torque converter impeller torque via limiting engine torque. Further, method 700 reduces the driveline disconnect clutch torque capacity via reducing transmission line pressure and directing at least a portion of the pumps flow capacity to the transmission lube circuit and the transmission cooler, thereby improving cooling of transmission oil. Since the line pressure was determined to be in a priority zone where at least a portion of flow is directed from the lube and transmission cooler to the driveline disconnect clutch, which tends to increase transmission oil temperature, the transmission line pressure is reduced as a function of transmission oil temperature and torque converter impeller speed (e.g., according to a function similar to the function illustrated in FIG. 6A). The reduction in line pressure reduces the torque capacity of the driveline disconnect clutch. Therefore, the engine torque is reduced to a torque that is less than the driveline disconnect clutch torque capacity (e.g., driveline torque capacity minus a predetermined offset torque) as a function of transmission oil temperature and torque converter impeller speed (e.g., according to a function similar to the function illustrated in FIG. 6A) and the negative torque of the electric machine is reduced to a torque that is less than engine torque so that the engine does not stall. The amount of the reduction in line pressure is also based on the condition of the torque converter clutch being unlocked, which necessitates a lower transmission line pressure to exit the priority zone. By reducing the negative torque of the electric machine (e.g., when the electric machine is operating in a generator mode), charging current supplied by the electric machine to the electric energy storage device is reduced, but transmission cooling is improved and while charging of the electric energy storage device may continue. Method 700 proceeds to 720.

At 720, method 700 judges if SOC of the electric energy storage device (e.g., 275 of FIG. 2) is greater than a threshold level. If so, the answer is yes and method 700 proceeds to exit. Otherwise, the answer is no and method 700 proceeds to 722.

At 722, method 700 may temporarily raise the driveline disconnect clutch torque capacity and the engine torque output along with electric machine electric charge output so that SOC of the electric energy storage device may be elevated above the threshold SOC. In one example, method 700 may increase the driveline disconnect clutch torque capacity, engine torque output, and electric machine charge output for a predetermined amount of time before again reducing the same to lower transmission temperature. Method 700 proceeds to exit.

In this way, temperatures of a transmission may be reduced while still charging an electric energy storage device via an engine through a driveline disconnect clutch and an electric machine. The method may specifically reduce oil flow directed to increase driveline disconnect clutch torque capacity when a vehicle is stopped and charging of an electric energy storage device is requested.

Thus, the method of FIG. 7 provides for a driveline operating method, comprising: adjusting engine torque responsive to a transmission oil temperature and a speed of a torque converter impeller via a controller; and adjusting a transmission line pressure responsive to the engine torque. The method further comprises adjusting a pressure supplied to a driveline disconnect clutch responsive to the engine torque. The method includes where the engine torque is adjusted via a torque actuator. The method includes where the torque actuator is an engine throttle. The method includes where the torque actuator is an ignition system. The method further comprises adjusting the transmission line pressure responsive to an operating state of a torque converter. The method includes where adjusting the transmission line pressure responsive to the operating state of the torque converter includes adjusting the transmission line pressure to a first pressure for a first speed of the torque converter impeller when a torque converter clutch is locked, and adjusting the transmission line pressure to a second pressure for the first speed of the torque converter impeller when the torque converter clutch is not locked. The method includes where the first pressure is less than the second pressure.

The method of FIG. 7 also provides for a driveline operating method, comprising: increasing torque of an engine and a driveline disconnect clutch pressure responsive to increasing an amount of charge supplied to a battery via an electric machine while a vehicle which includes the engine is stopped; adjusting engine torque responsive to the amount of charge supplied to the battery when a transmission oil pressure is not in a priority zone; and adjusting engine torque responsive to a transmission oil temperature and a speed of a torque converter impeller speed when the transmission oil pressure is in the priority zone. The method includes where the priority zone is where a portion of transmission pump output is directed according to a priority. The method also includes where the priority increases flow to the driveline disconnect clutch and decreases flow to a transmission oil heat exchanger. The method includes where adjusting engine torque include decreasing engine torque. The method further comprises decreasing the amount of charge supplied to the battery when the transmission oil pressure is in the priority zone. The method further comprises adjusting the transmission oil pressure responsive to an operating state of a torque converter. The method includes where adjusting engine torque includes adjusting an engine throttle position.

In another representation, the method of FIG. 7 provides for a driveline operating method, comprising: constraining transmission input torque to less than a threshold via adjusting torque of an engine and adjusting a torque capacity of a driveline disconnect clutch in response to a torque converter clutch being locked and transmission line pressure placing a lube circuit in a first priority zone, the first priority zone or region based on a first relationship between transmission line pressure and torque converter impeller speed for operating with a locked torque converter. The method further comprises constraining the transmission input torque to less than the threshold via adjusting torque of an engine and adjusting the torque capacity of the driveline disconnect clutch in response to a torque converter clutch being unlocked and transmission line pressure placing a lube circuit in a second priority zone, the second priority zone or region based on a second relationship between transmission line pressure and torque converter impeller speed for operating with an unlocked torque converter. The method further comprising adjusting a driveline disconnect clutch torque capacity based on a battery state of charge.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, single cylinder, I3, I4, I5, V6, V8, V10, and V12 engines operating in natural gas, gasoline, diesel, or alternative fuel configurations could use the present description to advantage.

The invention claimed is:

1. A driveline operating method, comprising:
adjusting engine torque responsive to a transmission oil temperature and a speed of a torque converter impeller via a controller; and
adjusting a transmission line pressure responsive to the engine torque.

2. The method of claim 1, further comprising adjusting a pressure supplied to a driveline disconnect clutch responsive to the engine torque.

3. The method of claim 1, where the engine torque is adjusted via a torque actuator.

4. The method of claim 3, where the torque actuator is an engine throttle.

5. The method of claim 3, where the torque actuator is an ignition system.

6. The method of claim 1, further comprising adjusting the transmission line pressure responsive to an operating state of a torque converter.

7. The method of claim 6, where adjusting the transmission line pressure responsive to the operating state of the torque converter includes adjusting the transmission line pressure to a first pressure for a first speed of the torque converter impeller when a torque converter clutch is locked, and adjusting the transmission line pressure to a second pressure for the first speed of the torque converter impeller when the torque converter clutch is not locked.

8. The method of claim 7, where the first pressure is less than the second pressure.

9. The method of claim 1, further comprising:
adjusting engine torque responsive to the amount of charge supplied to the battery when a transmission oil pressure is not in a priority zone.

10. The method of claim 9, where the priority zone is where a portion of transmission pump output is directed according to a priority.

11. The method of claim 1, further comprising adjusting a torque of an electric machine in response to a transmission oil pressure being in a priority zone.

12. The method of claim 11, where adjusting includes decreasing the torque of the electric machine.

13. The method of claim 1, further comprising decreasing a torque capacity of a driveline disconnect clutch in response to a transmission oil pressure being in a priority zone.

14. The method of claim 13, where adjusting engine torque includes reducing engine torque to less than the torque capacity of the driveline disconnect clutch.

15. The method of claim 1, further comprising adjusting engine torque responsive to an amount of charge supplied to a battery when a transmission oil pressure is not in a priority zone.

16. A system, comprising:
an engine;
an electric machine;
a driveline disconnect clutch included in a driveline and located between the engine and the electric machine, the driveline disconnect clutch coupled to the engine and the electric machine; and
a controller including executable instructions stored in non-transitory memory to adjust a torque of the engine responsive to a transmission oil temperature and a speed of a torque converter impeller speed.

17. The system of claim 16, further comprising a torque converter and a transmission.

18. The system of claim 17, where the torque converter is coupled to the transmission and the electric machine.

19. The system of claim 16, further comprising additional instructions to adjust a transmission line pressure responsive to the torque of the engine.

20. The system of claim 16, further comprising additional instructions to adjust a pressure supplied to a driveline disconnect clutch responsive to the torque of the engine.

* * * * *